(12) United States Patent
Yang

(10) Patent No.: US 9,169,909 B2
(45) Date of Patent: Oct. 27, 2015

(54) STEPLESS VARIABLE TRANSMISSION DEVICE WITH PARALLEL LOW GEAR WHEEL GROUP

(76) Inventor: Tai-Her Yang, Dzan-Hwa (TW)

(*) Notice: Subject to any disclaimer, the term of this patent is extended or adjusted under 35 U.S.C. 154(b) by 651 days.

(21) Appl. No.: 12/591,568

(22) Filed: Nov. 24, 2009

(65) Prior Publication Data

US 2011/0124450 A1    May 26, 2011

(51) Int. Cl.
| F16H 9/00 | (2006.01) |
| F16H 59/00 | (2006.01) |
| F16H 61/00 | (2006.01) |
| F16H 63/00 | (2006.01) |
| F16H 37/02 | (2006.01) |
| F16H 57/00 | (2012.01) |
| F16H 61/66 | (2006.01) |

(52) U.S. Cl.
CPC ...... *F16H 37/021* (2013.01); *F16H 2057/0012* (2013.01); *F16H 2061/6618* (2013.01)

(58) Field of Classification Search
CPC ........ A01D 69/06; A01D 69/08; A01F 12/40; F16H 2007/0806; F16H 2037/088
USPC .................. 474/58, 60, 70, 73, 76, 74, 69
See application file for complete search history.

(56) References Cited

U.S. PATENT DOCUMENTS

| 2,694,937 A * | 11/1954 | Birbaum ...................... 74/336 R |
| 2,809,535 A * | 10/1957 | Hein et al. ...................... 477/12 |
| 2,986,043 A * | 5/1961 | Jaulmes .......................... 474/15 |
| 3,581,853 A * | 6/1971 | Hoff .............................. 192/218 |
| 4,276,037 A * | 6/1981 | Ryan et al. ...................... 474/70 |
| 4,685,357 A * | 8/1987 | Sawada et al. ................... 477/48 |
| 5,184,981 A * | 2/1993 | Wittke ............................ 474/19 |
| 5,361,744 A * | 11/1994 | Teraoka ......................... 123/561 |
| 5,720,686 A * | 2/1998 | Yan et al. ...................... 475/211 |
| 5,820,508 A * | 10/1998 | Konig et al. ................... 475/210 |
| 6,773,367 B2 * | 8/2004 | Laufenberg et al. ............ 474/58 |
| 6,811,504 B2 * | 11/2004 | Korenjak et al. ............... 474/14 |
| 6,929,574 B2 * | 8/2005 | Laufenberg et al. ............ 474/70 |

\* cited by examiner

*Primary Examiner* — Henry Liu
(74) *Attorney, Agent, or Firm* — Bacon & Thomas, PLLC

(57) ABSTRACT

The present invention relates to a stepless variable transmission device with parallel low gear wheel group, which is the first case that a low gear transmission wheel group equipped with a one-way transmission unit, which transmits with fixed speed ratio in same rotary direction, is installed between the input shaft and the output shaft of a stepless variable transmission device; and which is installed with the clutch device 212 with angular displacement difference and/or the clutch device 222 for eliminating the vibration produced by the hetero-shaft type stepless variable transmission device 100 and the low gear transmission wheel group 102, the both do not operate with fully same speed ratio, for overloaded transmission.

19 Claims, 4 Drawing Sheets

STEPLESS VARIABLE TRANSMISSION DEVICE WITH PARALLEL LOW GEAR WHEEL GROUP

BACKGROUND OF THE INVENTION (a) Field of the Invention

For the various conventional hetero-shaft type stepless variable transmission devices, whose stepless variable operations are as following:

the pitches of the variable pitch V-type driving belt grooves of the original moving wheel and the passive wheel are regulated to change the radial distance for the operation of the strip transmission component on the original moving wheel or the passive wheel, and to further change the transmission ratio between the original moving wheel and the passive wheel; and as for the regulation of the pitches of the variable pitch V-type driving belt grooves of the original moving wheel and the passive wheel in the hetero-shaft type stepless variable transmission device, the required axial driving force is from one or more of the following:

1. by way of the mechanism producing variable centrifugal force with the change of the rotational speed of the input shaft, the variable axial driving force is produced for changing the pitch of the variable pitch V-type driving belt groove of the original moving wheel;

2. by way of the mechanism producing variable centrifugal force with the change of the rotational speed of the output shaft, the variable axial driving force is produced for changing the pitch of the variable pitch V-type driving belt groove of the passive wheel;

3. by way of the mechanism producing variable axial driving force with the change of the torsion of the input shaft, the axial driving force is produced for changing the pitch of the variable pitch V-type driving belt groove of the original moving wheel;

4. by way of the mechanism producing variable axial driving force with the change of the torsion of the output shaft, the axial driving force is produced for changing the pitch of the variable pitch V-type driving belt groove of the passive wheel;

5. the original moving wheel or the passive wheel is equipped with an axial preloading spring, through the original moving wheel or the passive wheel bearing the pulling force of the strip transmission component to produce the axial driving force, so as to change the pitches of the variable pitch V-type driving belt grooves of both or one of the original moving wheel and the passive wheel;

the above modes 1~5 are stepless variable transmission functions of the passive operation; and 6. the linear driving force produced by the linear driving device driven by manpower, machine power, electromagnetic effects, oil pressure, or air pressure, or the rotary power produced by driving a electric motor; an oil pressure motor, or air pressure motor, is actively produced, and transferred by the mechanical transmission device to axial linear driving force, so as to change the pitches of the variable pitch V-type driving belt grooves of both or one of the original moving wheel and the passive wheel; this mode is to actively manipulate the stepless variable transmission function.

(b) Description of the Prior Art

The traditional stepless variable transmission device with hetero-shaft type input shaft and output shaft is in a variety of modes, including rubber belt type, metal belt type, or chain type stepless variable transmission device, or electronic continuous variable transmission (ECVT), or friction disk type or conventional hetero-shaft type stepless variable transmission device.

SUMMARY OF THE INVENTION

The stepless variable transmission device with parallel low gear wheel group performs the stepless variable transmission function of the passive operation through the axial driving force produced by the operational torsion or rotational speed for axial driving the original moving wheel or the passive wheel, and coordianted with the manpower manipulation or the axial preloading spring equipped, or performs the stepless variable transmission function of the active manipulation through the manpower, electric power, machine power, oil pressure, or air pressure, and further refers to inoput settings including operational mode, detection speed, and torsion, to perform the speed ratio regulation and operation.

Because the hetero-shaft type stepless variable transmission device provides a function of automatic adjustment of the speed ratio, which follows speed change of the rotational speed of the input shaft of the original moving wheel and magnitude of the load torsion at the load side, there is a advantage of easy operation; but the hetero-shaft type stepless variable transmission device still has shortcomings as following:

1. the transmission power of the device is not high, thus it is only suitable for applications of small and medium power;

2. the transmission effeciency of the hetero-shaft type stepless variable transmission device is low; and 3. the durability needs to be strengthened.

The stepless variable transmission device with parallel low gear wheel group of the present invention is the first case that a low gear transmission wheel group equipped with a one-way transmission unit, which transmits with fixed speed ratio in same rotary direction, is installed between the input shaft and the output shaft of a stepless variable transmission device; and which is installed with a clutch device 212 with angular displacement difference and/or a clutch device 222 for eliminating the vibration between a hetero-shaft type stepless variable transmission device 100 and a low gear transmission wheel group 102, which is produced by the hetero-shaft type stepless variable transmission device 100 and the low gear transmission wheel group 102, because the both do not operate with fully same speed ratio, for overloaded transmission; if a deceleration type stepless variable transmission device is used to operate at the status of maximum speed ratio or near maximum speed ratio, or if an accelerated stepless variable transmission device is used to operate at the status of minimum speed ratio or near minimum speed ratio, when the rotational speed of the original moving wheel of the low gear transmission wheel group changes to be lower than that of the input shaft at the same rotary direction for overloaded transmission, the rotary kinetic energy of the input shaft drives the output shaft and further drives the load through the one-way transmission unit and the low gear transmission wheel group; and the transmission power at this status originally output by the hetero-shaft type stepless variable transmission device changes to be output by the low gear transmission wheel group.

DESCRIPTION OF MAIN COMPONENT SYMBOLS

Figure 1:
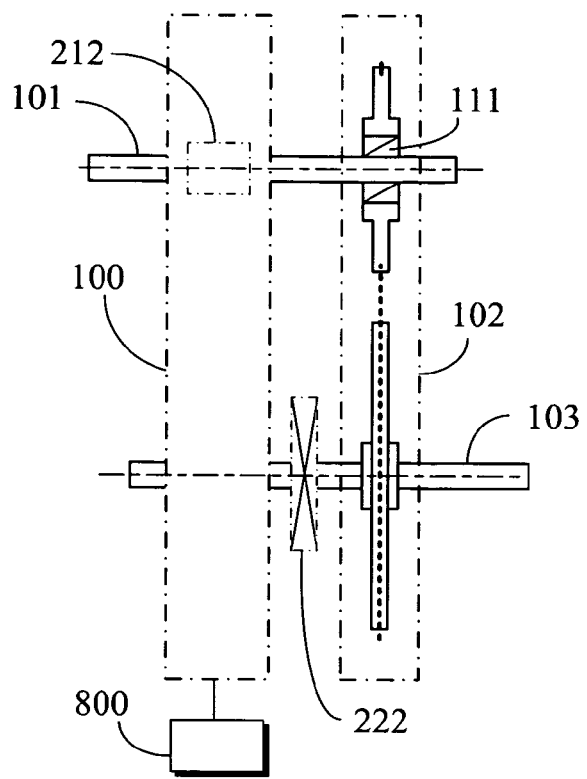
FIG. 1 is a schematic view showing the composition of the radial one-way transmission unit equipped, according to the present invention.

100: Hetero-shaft type stepless variable transmission device
101: Input shaft
102: Low gear transmission wheel group
103: Output shaft
111: One-way transmission unit
131, 141: Driven shaft
212: Clutch device with angular displacement difference
222: Clutch device
302, 402: Variable speed wheel group
800: Drive control device

DETAILED DESCRIPTION OF THE PREFERRED EMBODIMENTS

The stepless variable transmission device with parallel low gear wheel group performs the stepless variable transmission function of the passive operation through the axial driving force produced by the operational torsion or rotational speed for axial driving the original moving wheel or the passive wheel, and coordinated with the manpower manipulation or the axial preloading spring equipped, or performs the stepless variable transmission function of the active manipulation through the manpower, electric power, machine power, oil pressure, or air pressure, and further refers to inoput settings including operational mode, detection speed, and torsion, to perform the speed ratio regulation and operation.

Because the hetero-shaft type stepless variable transmission device provides a function of automatic adjustment of the speed ratio, which follows speed change of the rotational speed of the input shaft of the original moving wheel and magnitude of the load torsion at the load side, there is a advantage of easy operation; but the hetero-shaft type stepless variable transmission device still has shortcomings as following:

1. the transmission power of the device is not high, thus it is only suitable for applications of small and medium power;
2. the transmission effeciency of the hetero-shaft type stepless variable transmission device is low; and
3. the durability needs to be strengthened.

The stepless variable transmission device with parallel low gear wheel group of the present invention is the first case that a low gear transmission wheel group equipped with a one-way transmission unit, which transmits with fixed speed ratio in same rotary direction, is installed between the input shaft and the output shaft of a stepless variable transmission device; and which is installed with the clutch device 212 with angular displacement difference and/or the clutch device 222 for eliminating the vibration between the hetero-shaft type stepless variable transmission device 100 and the low gear transmission wheel group 102, which is produced by the hetero-shaft type stepless variable transmission device 100 and the low gear transmission wheel group 102, because the both do not operate with fully same speed ratio, for overloaded transmission; if a deceleration type stepless variable transmission device is used to operate at the status of maximum speed ratio or near maximum speed ratio, or if an accelerated stepless variable transmission device is used to operate at the status of minimum speed ratio or near minimum speed ratio, when the rotational speed of the original moving wheel of the low gear transmission wheel group changes to be lower than that of the input shaft at the same rotary direction for overloaded transmission, the rotary kinetic energy of the input shaft drives the output shaft and further drives the load through the one-way transmission unit and the low gear transmission wheel group; and the transmission power at this status originally output by the hetero-shaft type stepless variable transmission device changes to be output by the low gear transmission wheel group.

For the stepless variable transmission device with parallel low gear wheel group, the composition is as following.

Figure 2:
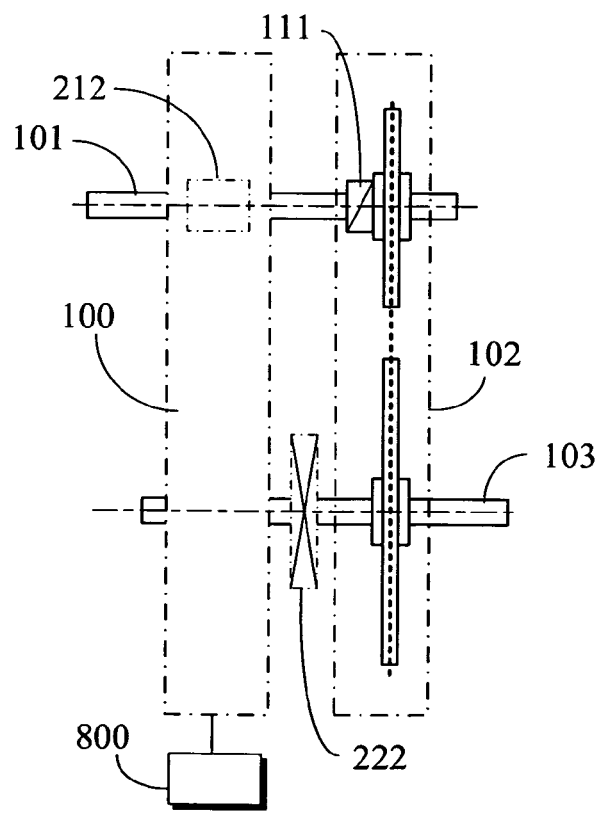
FIG. 2 is a schematic view showing the composition of the axial one-way transmission unit equipped, according to the present invention.
Figure 3:
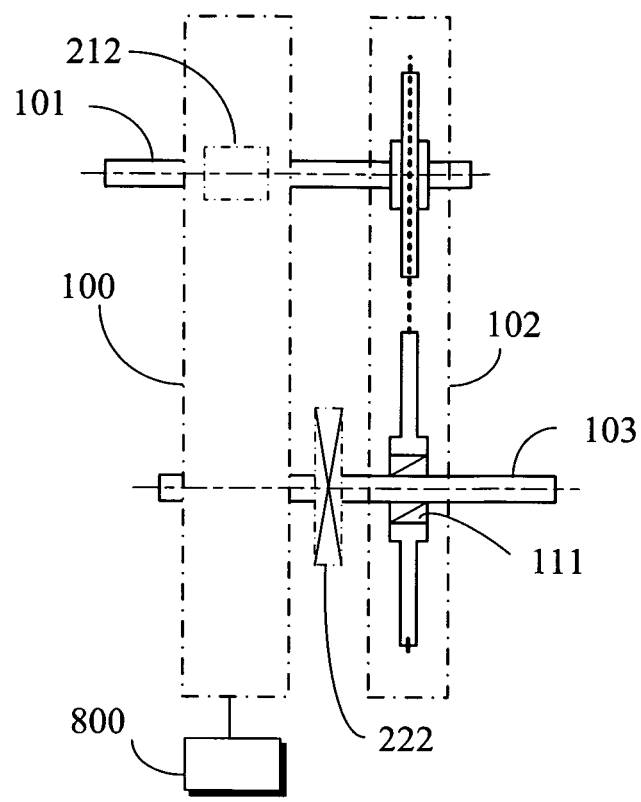
FIG. 3 is a schematic view showing the composition of the one-way transmission unit placed between the passive wheel of the low gear transmission wheel group and the output shaft, according to the present invention.
Figure 4:
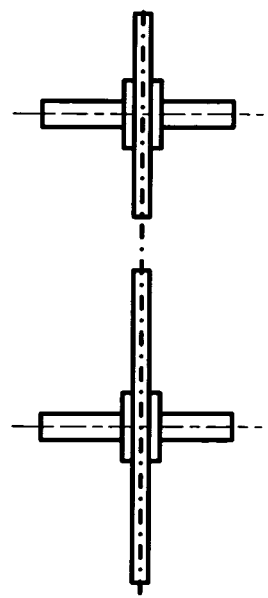
FIG. 4 is a schematic view showing the structure of the low gear transmission wheel group composed of the original moving sprocket, the passive sprocket, and the sprocket chain, according to the present invention.
Figure 5:
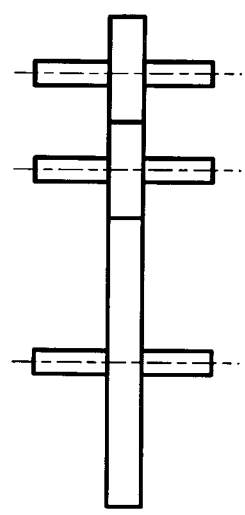
FIG. 5 is a schematic view showing the structure of the low gear transmission wheel group composed of the original moving wheel, the intermediate wheel, and the passive wheel, according to the present invention.
Figure 6:
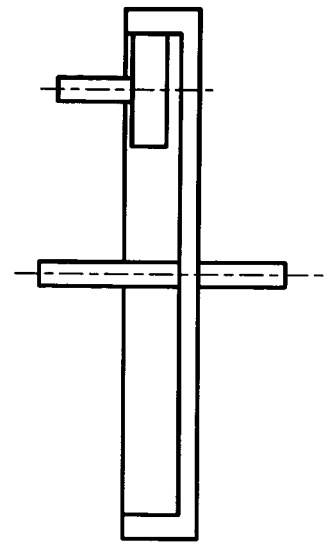
FIG. 6 is a schematic view showing the structure of the low gear transmission wheel group composed of the driving wheel with smaller outer diameter and the inward driving wheel with bigger outer diameter, according to the present invention.
Figure 7:
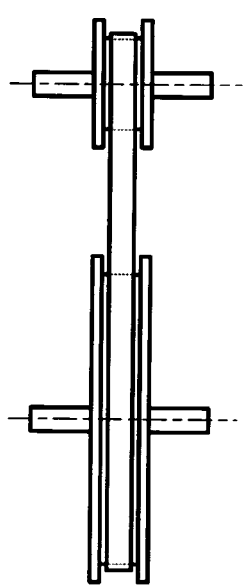
FIG. 7 is a schematic view showing the structure of the low gear transmission wheel group composed of the original moving pulley, the passive pulley, and the belt, according to the present invention.

As shown in FIG. 1, except for the related mechanisms of the conventional continuous variable transmission, the main components of the stepless variable transmission device with parallel low gear wheel group include:

Hetero-shaft type stepless variable transmission device
100: related to a stepless variable transmission device with a hetero-shaft type structure of an input shaft and an output shaft, wherein which is at least one of the following, such as rubber belt type, metal belt type, chain type, or friction disk type stepless variable transmission device, or ECVT, and includes the stepless variable transmission function of the passive operation through automatic adjustment of transmission ratio with the torsion or with the rotational speed, or performs the stepless variable transmission function of the active manipulation, through linear driving force produced by the linear driving device driven by external driving force source, or linear driving force converted by the mechanical transmission device from the rotary driving device, to change the pitches of the V-type driving belt grooves of the both or one of the original moving wheel and the passive wheel for adjustment of transmission ratio;

Input shaft 101: related to a revolving shaft for inputting rotary kinetic energy, which transmits the rotary kinetic energy to the original moving wheel of the hetero-shaft type stepless variable transmission device 100, and to the input of an one-way transmission unit 111;

Output shaft 103: related to a revolving shaft for outputting rotary kinetic energy to drive the load, which transmits the rotary kinetic energy transmitted by the passive wheel of the hetero-shaft type stepless variable transmission device 100, or the rotary kinetic energy transmitted by the passive wheel of the low gear transmission wheel group 102, to the load;

One-way transmission unit 111: composed of the radial one-way transmission unit with application as shown in FIG. 1, or the axial one-way transmission unit with application as shown in FIG. 2, which contains the elements with one-way transmission function, including one-way bearing, one-way clutch, or one-way transmission mechanism or device; the arrangement of the one-way transmission unit 111 is chose as needed, such as being installed between the input shaft 101 and the original moving wheel of the low gear transmission wheel group 102, or being installed between the passive wheel of the low gear transmission wheel group 102 and the output shaft 103, as shown in FIG. 3;

the transmission direction of the one-way transmission unit 111 is that if the rotational speed of the input shaft 101 is higer than that of the original moving wheel of the low gear transmission wheel group 102 at same rotary direction, the input shaft 101 can transmit the rotary kinetic energy to the original moving wheel of the low gear transmission wheel group 102; on the contrary, the input shaft 101 cannot transmit the rotary kinetic energy to the original moving wheel of the low gear transmission wheel group 102;

Clutch device 212 with angular displacement difference: composed of the sliding-type limited torsion device or the clutch-type limited torsion device with radial or axial structure, or flexible clutch device with angular displacement difference, which is installed between the passive wheel of the hetero-shaft type stepless variable transmission device 100 and the output shaft 103, or between the original moving wheel of the hetero-shaft type stepless variable transmission device 100 and the input shaft 101, wherein the reduction ratio of the hetero-shaft type stepless variable transmission device 100 becomes larger and the low gear transmission wheel group 102 is actuated for transmission when the output shaft 103 performs overloaded output, the clutch device 212 with angular displacement difference will rotate through angular displacement difference for sliding or disconnection; if the stepless variable transmission device with parallel low gear wheel group has been installed with the clutch device 222, the clutch device 212 with angular displacement difference will be installed or not as needed;

Clutch device 222: related to a device chose from the following as needed, (1) the centrifugal clutch or the overrunning clutch actuated by passive manipulation through entrifugal force, or torsion controlled passive clutch; or (2) the clutch driven by active manipulation of manpower or machine power, or by electromagnetic force, fluid pressure, or air pressure; wherein the clutch device 222 is used to be actively randomly controlled by manpower, or to be actively controlled to be disconnected or closed by the detection signals of the rotational speed or torque, which are produced by the built-in or external rotational speed detection device or torque detection device, through the operation of a drive control device 800; the clutch device 222 is installed between the output of the passive wheel of the hetero-shaft type stepless variable transmission device 100 and the output shaft 103, which is an independent structure or integrated with the passive wheel of the hetero-shaft type stepless variable transmission device 100, if the reduction ratio of the hetero-shaft type stepless variable transmission device 100 becomes larger near the speed ratio of the low gear transmission wheel group 102 when the output shaft 103 performs overloaded output, the clutch device 222 is disconnected to cut off the kinetic energy transmission; and if the stepless variable transmission device with parallel low gear wheel group has been installed with the clutch device 212 with angular displacement difference, the clutch device 222 will be installed or not as needed;

Low gear transmission wheel group 102: related to a device with the function of receiving the original moving wheel driven by the input shaft 101, and driving the passive wheel of the output shaft 103, wherein the original moving wheel and the passive wheel transmit at the same rotation direction, and the transmission ratio thereof is low gear transmission of reduction transmission relative to the hetero-shaft type stepless variable transmission device 100; the speed ratio relationships between the low gear transmission wheel group 102 and the hetero-shaft type stepless variable transmission device 100 are as following:

1. the speed ratio of the original moving wheel driving the passive wheel in the low gear transmission wheel group 102≤the speed ratio of the hetero-shaft type stepless variable transmission device 100 for low-speed output; or 2. the speed ratio of the hetero-shaft type stepless variable transmission device 100 for low-speed output<the speed ratio of the original moving wheel driving the passive wheel in the low gear transmission wheel group 102<the speed ratio of the hetero-shaft type stepless variable transmission device 100 for high-speed output;

the components of the low gear transmission wheel group 102 including:

1. which is composed of the original moving sprocket, the passive sprocket, and the sprocket chain, as shown in FIG. 4, which is a schematic view showing the structure of the low gear transmission wheel group 102 composed of the original moving sprocket, the passive sprocket, and the sprocket chain, according to the present invention; or 2. which is composed of the original moving wheel, the intermediate wheel, and the passive wheel, and the original moving wheel, the intermediate wheel, and the passive wheel are made of gears or friction wheels, as shown in FIG. 5, which is a schematic view showing the structure of the low gear transmission wheel group 102 composed of the original moving wheel, the intermediate wheel, and the passive wheel, according to the present invention; or 3. which is composed of inner gear group and inner friction wheel group, which are constituted by the driving wheel with smaller outer diameter and the inward driving wheel with bigger outer diameter, as shown in FIG. 6, which is a schematic view showing the structure of the low gear transmission wheel group 102 composed of the driving wheel with smaller outer diameter and the inward driving wheel with bigger outer diameter, according to the present invention; or 4. which is composed of the original moving pulley and the passive pulley, where are equipped with the belt, such as drive belt, drive steel belt, or drive chain, as shown in FIG. 7, which is a schematic view showing the structure of the low gear transmission wheel group 102 composed of the original moving pulley, the passive pulley, and the belt, according to the present invention; and Drive control device 800: related to a device arranged according to the figure of the chose hetero-shaft type stepless variable transmission device 100; wherein the drive control device is equipped with driving force source including electric energy supply unit, oil pressure supply unit, or air pressure supply unit, and related electric energy control unit, oil pressure control unit, or air pressure control unit, to actively manipulate the transmission ratio of the hetero-shaft type stepless variable transmission device 100; if the hetero-shaft type stepless variable transmission device 100 chose is the operational structure of automatic adjustment for transmission ratio with the torsion, or the operational structure of adjustment for transmission ratio with the rotational speed, which are stepless variable transmission device of passive operation, and the drive control device 800 may not be equipped; if the chose device performs the stepless variable transmission function of active manipulation through the external driving force source for transmission ratio regulation, the drive control device 800 must be equipped to actively manipulate the transmission ratio of the hetero-shaft type stepless variable transmission device 100.

For the stepless variable transmission device with parallel low gear wheel group constituted by the above main structure, in which the input shaft 101 of the hetero-shaft type stepless variable transmission device 100 is additionally installed with the original moving wheel of the low gear transmission wheel group 102, and the one-way transmission unit 111 is installed between the input shaft 101 and the original moving wheel, and the transmission direction of the input shaft 101 is that, for the stepless variable transmission device with the low gear transmission wheel group 102 with heavier load, if deceleration type stepless variable transmission device is adopted as the hetero-shaft type stepless variable transmission device 100 and operates at the status of maximum reduction ratio or near maximum reduction ratio, or if accelerated stepless variable transmission device is adopted and operates at the status of minimum speedup ratio or near minimum speedup ratio, the rotational speed of the original moving wheel of the low gear transmission wheel group 102 is changed to be lower than that of input shaft 101 at same rotary direction, and the rotary kinetic energy of input shaft 101 drives the output shaft 103 and further drives the load through the one-way transmission unit 111 and the low gear transmission wheel group 102, in this state, the transmission power driving the output shaft 103 originally through the hetero-shaft type stepless variable transmission device 100 is transferred to be through the low gear transmission wheel group 102; and in a lighter load state, the output shaft 103 is driven by the kinetic energy transmitted through the hetero-shaft type stepless variable transmission device 100.

The one-way transmission unit 111 is installed between the passive wheel of the low gear transmission wheel group 102 and the output shaft 103, in a heavier load state, if deceleration type stepless variable transmission device is adopted as the hetero-shaft type stepless variable transmission device 100 and operates at the status of maximum reduction ratio or near maximum reduction ratio, or if accelerated stepless variable transmission device is adopted and operates at the status of minimum speedup ratio or near minimum speedup ratio, the rotational speed of the passive wheel of the low gear transmission wheel group 102 is changed to be higher than that of the output shaft 103 at same rotary direction, and the rotary kinetic energy drives the output shaft 103 and further drives the load through the low gear transmission wheel group 102 and the one-way transmission unit 111, in this state, the transmission power driving the output shaft 103 originally through the hetero-shaft type stepless variable transmission device 100 is transferred to be through the low gear transmission wheel group 102; and in a lighter load state, the output shaft 103 is driven by the kinetic energy transmitted through the hetero-shaft type stepless variable transmission device 100.

For the stepless variable transmission device with parallel low gear wheel group, if the clutch device 212 with angular displacement difference is installed between the input shaft 101 and the hetero-shaft type stepless variable transmission device 100, the clutch device 212 with angular displacement difference performs the functions, in which the reduction ratio of the hetero-shaft type stepless variable transmission device 100 becomes larger and the low gear transmission wheel group 102 is actuated for transmission when the output shaft 103 performs overloaded output, the clutch device 212 with angular displacement difference will rotate through angular displacement difference for sliding or disconnection, for eliminating the vibration between the hetero-shaft type stepless variable transmission device 100 and the low gear transmission wheel group 102, which is produced by the hetero-shaft type stepless variable transmission device 100 and the low gear transmission wheel group 102, because the both do not operate with fully same speed ratio, for overloaded transmission; and/or the clutch device 222 is installed at the output shaft 103 between the hetero-shaft type stepless variable transmission device 100 and the low gear transmission wheel group 102, in which the reduction ratio of the hetero-shaft type stepless variable transmission device 100 becomes larger and the low gear transmission wheel group 102 is actuated for transmission when the output shaft 103 performs overloaded output, to control the clutch device 222 to be open, for eliminating the vibration between the hetero-shaft type stepless variable transmission device 100 and the low gear transmission wheel group 102, which is produced by the hetero-shaft type stepless variable transmission device 100 and the low gear transmission wheel group 102, because the both do not operate with fully same speed ratio, for overloaded transmission.

Figure 8:
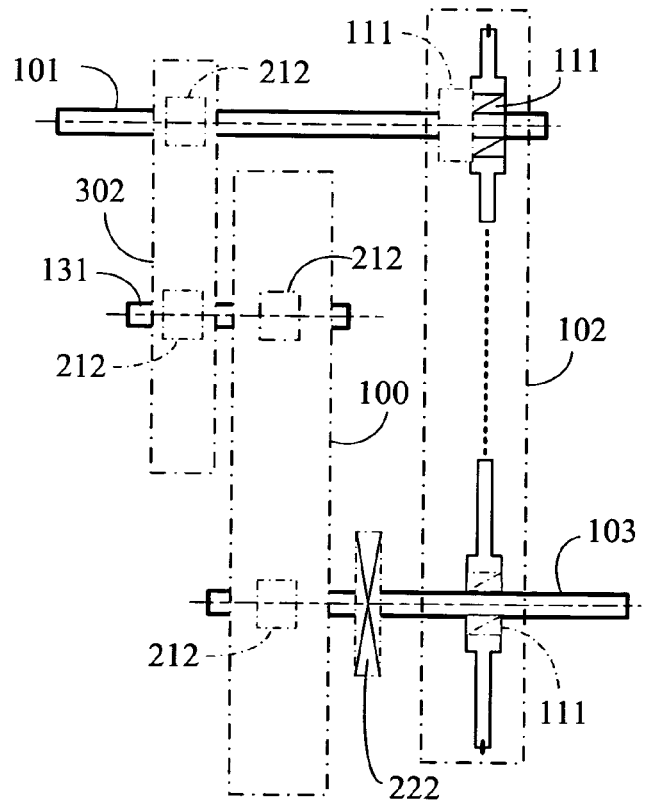
FIG. 8 is a schematic view showing the structure of the variable speed wheel group additionally installed between the input shaft and the original moving wheel of the hetero-shaft type stepless variable transmission device, according to the present invention.
Figure 9:
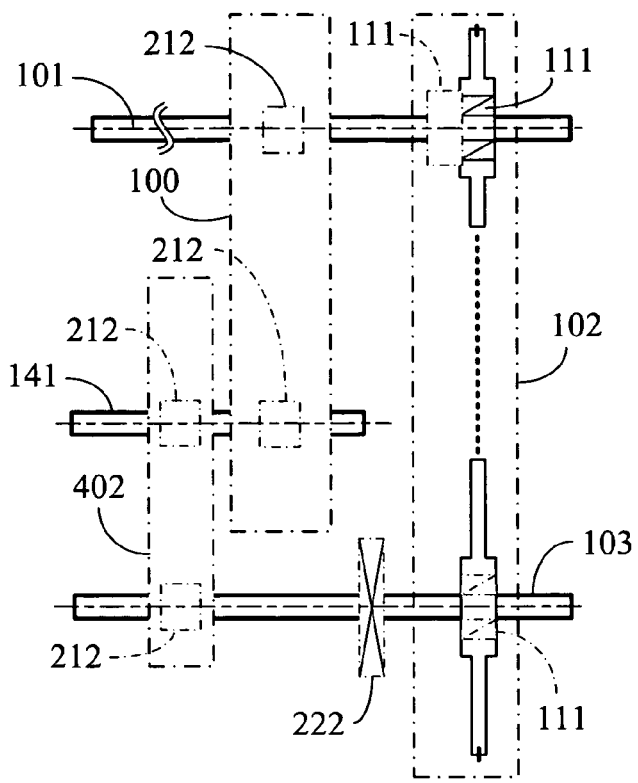
FIG. 9 is a schematic view showing the structure of the variable speed wheel group additionally installed between the output shaft and the passive wheel of the hetero-shaft type stepless variable transmission device, according to the present invention.
Figure 10:
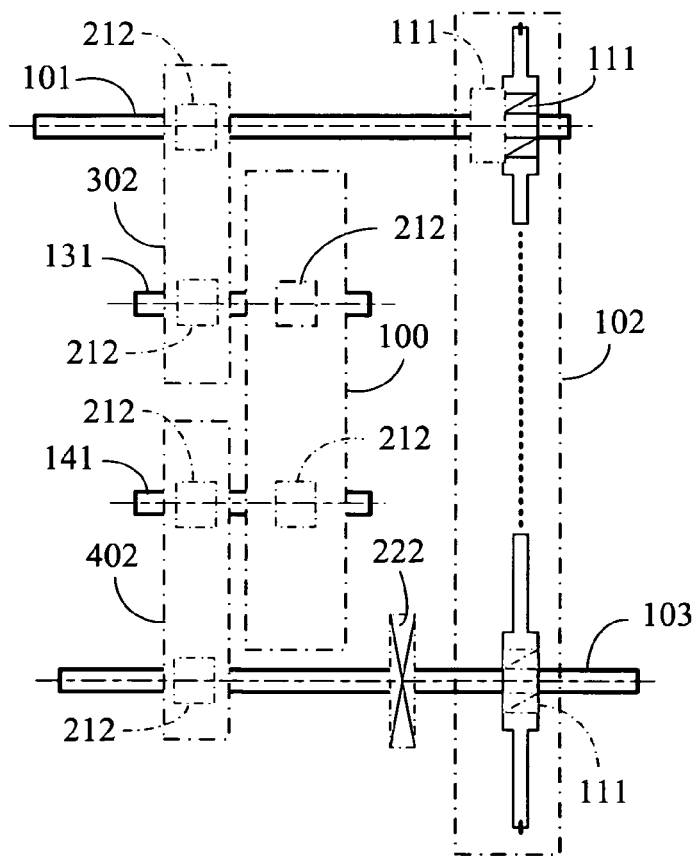
FIG. 10 is a schematic view showing the structure of the variable speed wheel groups additionally installed between the input shaft and the original moving wheel of the hetero-shaft type stepless variable transmission device, and the output shaft and the passive wheel of the hetero-shaft type stepless variable transmission device, according to the present invention.

For the stepless variable transmission device with parallel low gear wheel group, based on efficiency considerations, the original moving wheel and the passive wheel of the hetero-shaft type stepless variable transmission device 100 are adopted to have similar diameters to keep better efficiency, and an intermediate driving wheel is additionally installed to increase or decrease the speed ratio to meet the larger speedup ratio or reduction ratio, so as to keep better transmission efficiency; the intermediate driving wheel includes that:

1. a variable speed wheel group 302 and a driven shaft 131 are additionally installed between the input shaft 101 and the original moving wheel of the hetero-shaft type stepless variable transmission device 100, to change the total speed ratio of the input shaft 101 and the output shaft 103, and to match the desired rotary direction; in which:

if the clutch device 212 with angular displacement difference is installed, the clutch device 212 with angular displacement difference is installed between the passive wheel of the hetero-shaft type stepless variable transmission device 100 and the output shaft 103, or the original moving wheel of the hetero-shaft type stepless variable transmission device 100 and the driven shaft 131, or the driven shaft 131 and the passive wheel of the variable speed wheel group 302, or the input shaft 101 and the original moving wheel of the variable speed wheel group 302; if the stepless variable transmission device with parallel low gear wheel group has been installed with the clutch device 222, the clutch device 212 with angular displacement difference will be installed or not as needed;

Clutch device 222: related to a device chose from the following as needed, (1) the centrifugal clutch or the overrunning clutch actuated by passive manipulation through entrifugal force, or torsion controlled passive clutch; or (2) the clutch driven by active manipulation of manpower or machine power, or by electromagnetic force, fluid pressure, or air pressure; wherein the clutch device 222 is used to be actively randomly controlled by manpower, or to be actively controlled to be disconnected or closed by the detection signals of the rotational speed or torque, which are produced by the built-in or external rotational speed detection device or torque detection device, through the operation of a drive control device 800; the clutch device 222 is installed between the output of the passive wheel of the hetero-shaft type stepless variable transmission device 100 and the output shaft 103, which is an independent structure or integrated with the passive wheel of the hetero-shaft type stepless variable transmission device 100, if the reduction ratio of the hetero-shaft type stepless variable transmission device 100 becomes larger near the speed ratio of the low gear transmission wheel group 102 when the output shaft 103 performs overloaded output, the clutch device 222 is disconnected to cut off the kinetic energy transmission; and if the stepless variable transmission device with parallel low gear wheel group has been installed with the clutch device 212 with angular displacement difference, the clutch device 222 will be installed or not as needed;

FIG. 8 is a schematic view showing the structure of the variable speed wheel group additionally installed between the input shaft 101 and the original moving wheel of the hetero-shaft type stepless variable transmission device 100, according to the present invention; or 2. a variable speed wheel group 402 and a driven shaft 141 are additionally installed between the output shaft 103 and the passive wheel of the hetero-shaft type stepless variable transmission device 100, to change the total speed ratio of the input shaft 101 and the output shaft 103, and to match the desired rotary direction; in which:

if the clutch device 212 with angular displacement difference is installed, the clutch device 212 with angular displacement difference is installed between the original moving wheel of the hetero-shaft type stepless variable transmission device 100 and the input shaft 101, or the passive wheel of the hetero-shaft type stepless variable transmission device 100 and the driven shaft 141, or the driven shaft 141 and the original moving wheel of the variable speed wheel group 402, or the passive wheel of the variable speed wheel group 402 and the output shaft 103; if the stepless variable transmission device with parallel low gear wheel group has been installed with the clutch device 222, the clutch device 212 with angular displacement difference will be installed or not as needed;

Clutch device 222: related to a device chose from the following as needed, (1) the centrifugal clutch or the overrunning clutch actuated by passive manipulation through entrifugal force, or torsion controlled passive clutch; or (2) the clutch driven by active manipulation of manpower or machine power, or by electromagnetic force, fluid pressure, or air pressure; wherein the clutch device 222 is used to be actively randomly controlled by manpower, or to be actively controlled to be disconnected or closed by the detection signals of the rotational speed or torque, which are produced by the built-in or external rotational speed detection device or torque detection device, through the operation of a drive control device 800; the clutch device 222 is installed between the output of the passive wheel of the hetero-shaft type stepless variable transmission device 100 and the output shaft 103, which is an independent structure or integrated with the passive wheel of the hetero-shaft type stepless variable transmission device 100, if the reduction ratio of the hetero-shaft type stepless variable transmission device 100 becomes larger near the speed ratio of the low gear transmission wheel group 102 when the output shaft 103 performs overloaded output, the clutch device 222 is disconnected to cut off the kinetic energy transmission; and if the stepless variable transmission device with parallel low gear wheel group has been installed with the clutch device 212 with angular displacement difference, the clutch device 222 will be installed or not as needed;

FIG. 9 is a schematic view showing the structure of the variable speed wheel group additionally installed between the output shaft 103 and the passive wheel of the hetero-shaft type stepless variable transmission device 100, according to the present invention; or 3. variable speed wheel groups 302 and 304 and the driven shafts 131 and 141 are additionally installed between the input shaft 101 and the original moving wheel of the hetero-shaft type stepless variable transmission device 100, and the output shaft 103 and the passive wheel of the hetero-shaft type stepless variable transmission device 100, respectively, to change the total speed ratio of the input shaft 101 and the output shaft 103 via the hetero-shaft type stepless variable transmission device 100, and to match the desired rotary direction; in which:

if the clutch device 212 with angular displacement difference is installed, the clutch device 212 with angular displacement difference is installed between the input shaft 101 and the original moving wheel of the variable speed wheel group 302, or the passive wheel of the variable speed wheel group 302 and the driven shaft 131, or the driven shaft 131 and the original moving wheel of the hetero-shaft type stepless variable transmission device 100, or the passive wheel of the hetero-shaft type stepless variable transmission device 100 and the driven shaft 141, or the driven shaft 141 and the original moving wheel of the variable speed wheel group 402, or the passive wheel of the variable speed wheel group 402 and the output shaft 103; if the stepless variable transmission device with parallel low gear wheel group has been installed with the clutch device 222, the clutch device 212 with angular displacement difference will be installed or not as needed;

Clutch device 222: related to a device chose from the following as needed, (1) the centrifugal clutch or the overrunning clutch actuated by passive manipulation through centrifugal force, or torsion controlled passive clutch; or (2) the clutch driven by active manipulation of manpower or machine power, or by electromagnetic force, fluid pressure, or air pressure; wherein the clutch device 222 is used to be actively randomly controlled by manpower, or to be actively controlled to be disconnected or closed by the detection signals of the rotational speed or torque, which are produced by the built-in or external rotational speed detection device or torque detection device, through the operation of a drive control device 800; the clutch device 222 is installed between the output of the passive wheel of the hetero-shaft type stepless variable transmission device 100 and the output shaft 103, which is an independent structure or integrated with the passive wheel of the hetero-shaft type stepless variable transmission device 100, if the reduction ratio of the hetero-shaft type stepless variable transmission device 100 becomes larger near the speed ratio of the low gear transmission wheel group 102 when the output shaft 103 performs overloaded output, the clutch device 222 is disconnected to cut off the kinetic energy transmission; and if the stepless variable transmission device with parallel low gear wheel group has been installed with the clutch device 212 with angular displacement difference, the clutch device 222 will be installed or not as needed;

FIG. 10 is a schematic view showing the structure of the variable speed wheel groups additionally installed between the input shaft 101 and the original moving wheel of the hetero-shaft type stepless variable transmission device 100, and the output shaft 103 and the passive wheel of the hetero-shaft type stepless variable transmission device 100, according to the present invention.

For the stepless variable transmission device with parallel low gear wheel group, based on the needs of application, the low gear transmission wheel group is chose as follows, including:

1. the device is constituted by the low gear transmission wheel group with single-stage fixed speed ratio; or
2. the device is constituted by the multi-stage switchable low gear transmission wheel group with variable speed ratio of multi-stage manual or automatic shift.

For the stepless variable transmission device with parallel low gear wheel group, based on the needs of application, the rotary kinetic energy transmitted to input shaft 101 is input by one or more types as follows, including:

1) the input shaft 101 is directly input from the rotary power source, such as engine, moto, or generator, or flywheel, or wind blade set, or airflow or liquid flow force turbine set, rotary power source driven by manpower;
2) the rotary kinetic energy input the input shaft 101 from the rotary power source in 1) is then output through the manipulation of the clutch device;
3) the rotary kinetic energy input the input shaft 101 from the rotary power source in 1) is then output through variable speed device with fixed speed ratio, or manual or automatic shift step or stepless variable speed device, or stream power transmission device, or electromagnetic eddy current transmission device; and
4) the rotary kinetic energy input the input shaft 101 from the rotary power source in 1) is then output through the clutch device and variable speed device with fixed speed ratio, or manual or automatic shift step or stepless variable speed device, or stream power transmission device, or electromagnetic eddy current transmission device.

For the stepless variable transmission device with parallel low gear wheel group, based on the needs of application, the rotary kinetic energy is output from the output shaft 103 by the way chose as following:

1) the rotary kinetic energy output by the output shaft 103 directly drives the load; or
2) the rotary kinetic energy output by the output shaft 103 drives the load through the manipulation of the clutch device; or
3) the rotary kinetic energy output by the output shaft 103 drives the load through variable speed device with fixed speed ratio, or manual or automatic shift step or stepless variable speed device, or stream power transmission device, or electromagnetic eddy current transmission device; or
4) the rotary kinetic energy output by the output shaft 103 drives the load through the clutch device and variable speed device with fixed speed ratio, or manual or automatic shift step or stepless variable speed device, or stream power transmission device, or electromagnetic eddy current transmission device.

For the stepless variable transmission device with parallel low gear wheel group, the structure for application is chose as needed to make the hetero-shaft type stepless variable transmission device 100 and the low gear transmission wheel group 102 to be separate mechanical devices and then transmission linking together, or integrated mechanical device, or integrated mechanical device with common case.

Combinations of the above, for the stepless variable transmission device with parallel low gear wheel group, the low gear transmission wheel group 102 installed transmits the kinetic energy to drive the output shaft 103 and then to drive the load for overloaded transmission, so as to extend the life of the stepless variable transmission device and improve the load efficiency.

What is claimed is:

1. A stepless variable transmission with a parallel low gear wheel group, comprising:
   a hetero-shaft stepless variable transmission device (100) having an input shaft (101) coupled to a variable transmission moving wheel and an output shaft (103) coupled to a variable transmission passive wheel via a clutch device (222) installed between the variable transmission device passive wheel and the output shaft (103);
   a low gear transmission wheel group (102) having a low gear transmission moving wheel and a low gear transmission passive wheel, wherein the low gear transmission wheel group (102) includes at least one of:
   (i) a chain and sprockets;
   (ii) gears or friction wheels, including the low gear transmission moving wheel, the low gear transmission passive wheel, and/or an intermediate wheel;
   (iii) an inner gear group or inner friction wheel group, which are constituted by a driving wheel with a smaller outer diameter and an inward driving wheel with bigger outer diameter; and
   a one-way transmission unit (111) installed in one of the following positions: (a) between the input shaft (101) and the low gear transmission moving wheel, and (b) between the low gear transmission passive wheel and the output shaft (103),
   wherein the input shaft (101) transmits input rotary kinetic energy to the variable transmission moving wheel, and to an input of the one-way transmission unit (111),
   wherein the output shaft (103) transmits rotary kinetic energy from the variable transmission passive wheel, or from the low gear transmission passive wheel, to a load,
   wherein when the rotational speed of the input shaft (101) is higher than that of the low gear transmission moving wheel in a same rotary direction, then the input shaft (101) transmits the input rotary kinetic energy via the one-way transmission unit (111) to the low gear transmission moving wheel, and when the rotational speed of the input shaft (101) is not higher than that of the low gear transmission wheel in the same rotary direction, then the input rotary kinetic energy is prevented from being transmitted from the input shaft (101) to the low gear transmission moving wheel, and wherein speed ratio relationships between the low gear transmission wheel group (102) and the hetero-shaft stepless variable transmission device (100) are arranged as follows:

(i) a speed ratio at which the low gear transmission moving wheel drives the low gear transmission passive wheel ≤ a speed ratio of the hetero-shaft stepless variable transmission device (100) for a first output speed; or (ii) the speed ratio of the hetero-shaft stepless variable transmission device (100) for the first output speed < the speed ratio at which the low gear transmission moving wheel drives the low gear transmission passive wheel < a speed ratio of the hetero-shaft stepless variable transmission device (100) for a second output speed that is higher than said first output speed, and wherein when the output shaft (103) is overloaded, the reduction ratio of the hetero-shaft stepless variable transmission device (100) increases to near a speed ratio of the low gear transmission wheel group (102), at which time the clutch device (222) is disconnected to cut off kinetic energy transmission from the variable transmission device passive wheel to the output shaft (103) so as to eliminate vibration due to a speed ratio difference between the hetero-shaft stepless variable transmission device and (100) and the low gear transmission wheel group (102).

2. A stepless variable transmission with a parallel low gear wheel group as claimed in claim 1, further comprising a clutch device (212) with angular displacement difference installed in one of the following positions: (a) between the variable transmission device passive wheel and the output shaft (103), and (b) between the variable transmission device moving wheel and the input shaft (101), wherein:

when the output shaft (103) is overloaded, the reduction ratio of the hetero-shaft stepless variable transmission device (100) increases and the low gear transmission wheel group (102) is actuated for transmission, at which time the clutch device (212) with angular displacement different rotates through the angular displacement difference for sliding or disconnection so as to eliminate vibration due to a speed ratio difference between the hetero-shaft stepless variable transmission device and (100) and the low gear transmission wheel group (102).

3. A stepless variable transmission with a parallel low gear wheel group as claimed in claim 2, wherein the clutch device with angular displacement difference (212) is composed of one of a sliding-type limited torsion device, a clutch-type radial or axial limited torsion device, and a flexible clutch device with angular displacement difference.

4. A stepless variable transmission with a parallel low gear wheel group as claimed in claim 1, wherein the clutch device (222) is composed of one of (a) a centrifugal clutch, (b) an overrunning clutch actuated by passive manipulation through centrifugal force, (c) a torsion controlled passive clutch, (d) a clutch randomly controlled by manpower, and (e) a clutch actively controlled to be disconnected or closed by machine power, electromagnetic force, fluid pressure, or air pressure in response to detection signals from a rotational speed or torque detection device.

5. A stepless variable transmission with a parallel low gear wheel group as claimed in claim 1, wherein said hetero-shaft stepless variable transmission device (100) is one of the following types of transmission device: a rubber belt type; a metal belt type; a chain type; a friction disk stepless type; and an electronic continuously variable transmission (ECVT).

6. A stepless variable transmission with a parallel low gear wheel group as claimed in claim 1, wherein the speed ratio of the hetero-shaft stepless variable transmission device (100) is passively adjusted in response to torsion or rotational speed.

7. A stepless variable transmission with a parallel low gear wheel group as claimed in claim 1, wherein the speed ratio of the hetero-shaft stepless variable transmission device (100) is actively adjusted by a linear driving force generated by a linear driving device, or by a linear mechanical device that converts a rotary driving force into a linear driving force, and further comprising drive control device (800) for actively controlling the linear driving force.

8. A stepless variable transmission with a parallel low gear wheel group as claimed in claim 1, wherein a transmission ratio of the hetero-shaft variable transmission device is adjusted by changing pitches of V-type driving belt grooves in one or both of the variable transmission device moving wheel and the variable transmission device passive wheel.

9. A stepless variable transmission with a parallel low gear wheel group as claimed in claim 1, wherein the one-way transmission unit (111) is a radial or axial one-way transmission unit including at least one of a one-way bearing, one-way clutch, and one-way transmission mechanism.

10. A stepless variable transmission with a parallel low gear wheel group as claimed in claim 1, wherein:

the one-way transmission unit (111) is installed between the input shaft (101) and the low gear transmission moving wheel, and the hetero-shaft variable transmission device (100) is a deceleration-type variable transmission device that operates near or at a maximum reduction ratio, or an acceleration-type variable transmission device that operates near or at a minimum speed-up ratio, such that:

when the output shaft (103) is in a high load state, the rotational speed of the low gear transmission moving wheel is lower than a rotational speed of the input shaft (101) in the same rotary direction, and the rotary kinetic energy of the input shaft (101) drives the output shaft (103) and the load through the one-way transmission (111) and the low gear transmission wheel group (102) rather than through the hetero-shaft variable transmission device (100), and when the output shaft (103) is in a low load state, the rotary kinetic energy of the input shaft (101) drives the output shaft (103) through the hetero-shaft variable transmission device (100).

11. A stepless variable transmission with a parallel low gear wheel group as claimed in claim 1, wherein:

the one-way transmission unit (111) is installed between the low gear transmission passive wheel and the output shaft (103), and the hetero-shaft variable transmission device (100) is a deceleration-type variable transmission device that operates near or at a maximum reduction ratio, or an acceleration-type variable transmission device that operates near or at a minimum speed-up ratio, such that:

when the output shaft (103) is in a high load state, the rotational speed of the low gear transmission passive wheel is higher than a rotational speed of the output shaft (103) in the same rotary direction, then the rotary kinetic energy of the input shaft (101) drives the output shaft (103) and the load through the one-way transmission (111) and the low gear transmission wheel group (102) rather than through the hetero-shaft variable transmission device (100), and when the output shaft (103) is in a low load state, the rotary kinetic energy of the input shaft (101) drives the output shaft (103) through the hetero-shaft variable transmission device (100).

12. A stepless variable transmission with a parallel low gear wheel group as claimed in claim 1, wherein the variable transmission device moving wheel and the variable transmission device passive wheel have similar diameters, and further comprising:
  a variable speed wheel group (302) and a driven shaft (131) installed between the input shaft (101) and the variable transmission device moving wheel for changing a total speed ratio and relative rotation direction between the input shaft (101) and the output shaft (103), the driven shaft (131) coupling the hetero-shaft stepless variable transmission device (100) and the variable speed wheel group (302).

13. A stepless variable transmission with a parallel low gear wheel group as claimed in claim 12, further comprising a clutch device (212) with angular displacement difference installed between the variable transmission device moving wheel and the driven shaft (131), or between the driven shaft (131) and a passive wheel of the variable speed wheel group (302), wherein:
  when the output shaft (103) is overloaded, the reduction ratio of the hetero-shaft stepless variable transmission device (100) increases and the low gear transmission wheel group (102) is actuated for transmission, at which time the clutch device (212) with angular displacement different rotates through the angular displacement difference for sliding or disconnection so as to eliminate vibration due to a speed ratio difference between the hetero-shaft stepless variable transmission device and (100) and the low gear transmission wheel group (102).

14. A stepless variable transmission with a parallel low gear wheel group as claimed in claim 1, wherein the variable transmission device moving wheel and the variable transmission device passive wheel have similar diameters, and further comprising:
  a variable speed wheel group (402) and a driven shaft (141) installed between the variable transmission device passive wheel and the output shaft (103) for changing a total speed ratio and relative rotation direction between the input shaft (101) and the output shaft (103), the driven shaft (141) coupling the hetero-shaft stepless variable transmission device (100) and the variable speed wheel group (402).

15. A stepless variable transmission with a parallel low gear wheel group as claimed in claim 14, further comprising a clutch device (212) with angular displacement difference installed between the variable transmission device passive wheel and the driven shaft (141), or between the driven shaft (141) and the variable speed wheel group (402), wherein:
  when the output shaft (103) is overloaded, the reduction ratio of the hetero-shaft stepless variable transmission device (100) increases and the low gear transmission wheel group (102) is actuated for transmission, at which time the clutch device (212) with angular displacement different rotates through the angular displacement difference for sliding or disconnection so as to eliminate vibration due to a speed ratio difference between the hetero-shaft stepless variable transmission device and (100) and the low gear transmission wheel group (102).

16. A stepless variable transmission with a parallel low gear wheel group as claimed in claim 14, wherein said clutch device (222) is installed between the variable speed wheel group (402) and the output shaft (103).

17. A stepless variable transmission with a parallel low gear wheel group as claimed in claim 1, wherein the variable transmission device moving wheel and the variable transmission device passive wheel have similar diameters, and further comprising:
  a first variable speed wheel group (302) and a driven shaft (131) installed between the input shaft (101) and the variable transmission device moving wheel for changing a total speed ratio and relative rotation direction between the input shaft (101) and the output shaft (103), the driven shaft (131) coupling the hetero-shaft stepless variable transmission device (100) and the variable speed wheel group (302); and
  a second variable speed wheel group (402) and a driven shaft (141) installed between the variable transmission device passive wheel and the output shaft (103) for further changing a total speed ratio and relative rotation direction between the input shaft (101) and the output shaft (103), the driven shaft (141) coupling the hetero-shaft stepless variable transmission device (100) and the variable speed wheel group (402).

18. A stepless variable transmission with a parallel low gear wheel group as claimed in claim 17, further comprising a clutch device (212) with angular displacement difference installed between (a) the variable transmission device moving wheel and the driven shaft (131), (b) the driven shaft (131) and a passive wheel of the variable speed wheel group (302), (c) the variable transmission device passive wheel and the driven shaft (141), or (d) the driven shaft (141) and the variable speed wheel group (402), wherein:
  when the output shaft (103) is overloaded, the reduction ratio of the hetero-shaft stepless variable transmission device (100) increases and the low gear transmission wheel group (102) is actuated for transmission, at which time the clutch device (212) with angular displacement different rotates through the angular displacement difference for sliding or disconnection so as to eliminate vibration due to a speed ratio difference between the hetero-shaft stepless variable transmission device and (100) and the low gear transmission wheel group (102).

19. A stepless variable transmission with a parallel low gear wheel group as claimed in claim 17, wherein said clutch device (222) is installed between the variable speed wheel group (402) and the output shaft (103).

* * * * *